J. T. HOPE.
VACUUM CLEANER TOOL.
APPLICATION FILED FEB. 6, 1912.
1,086,367.
Patented Feb. 10, 1914.
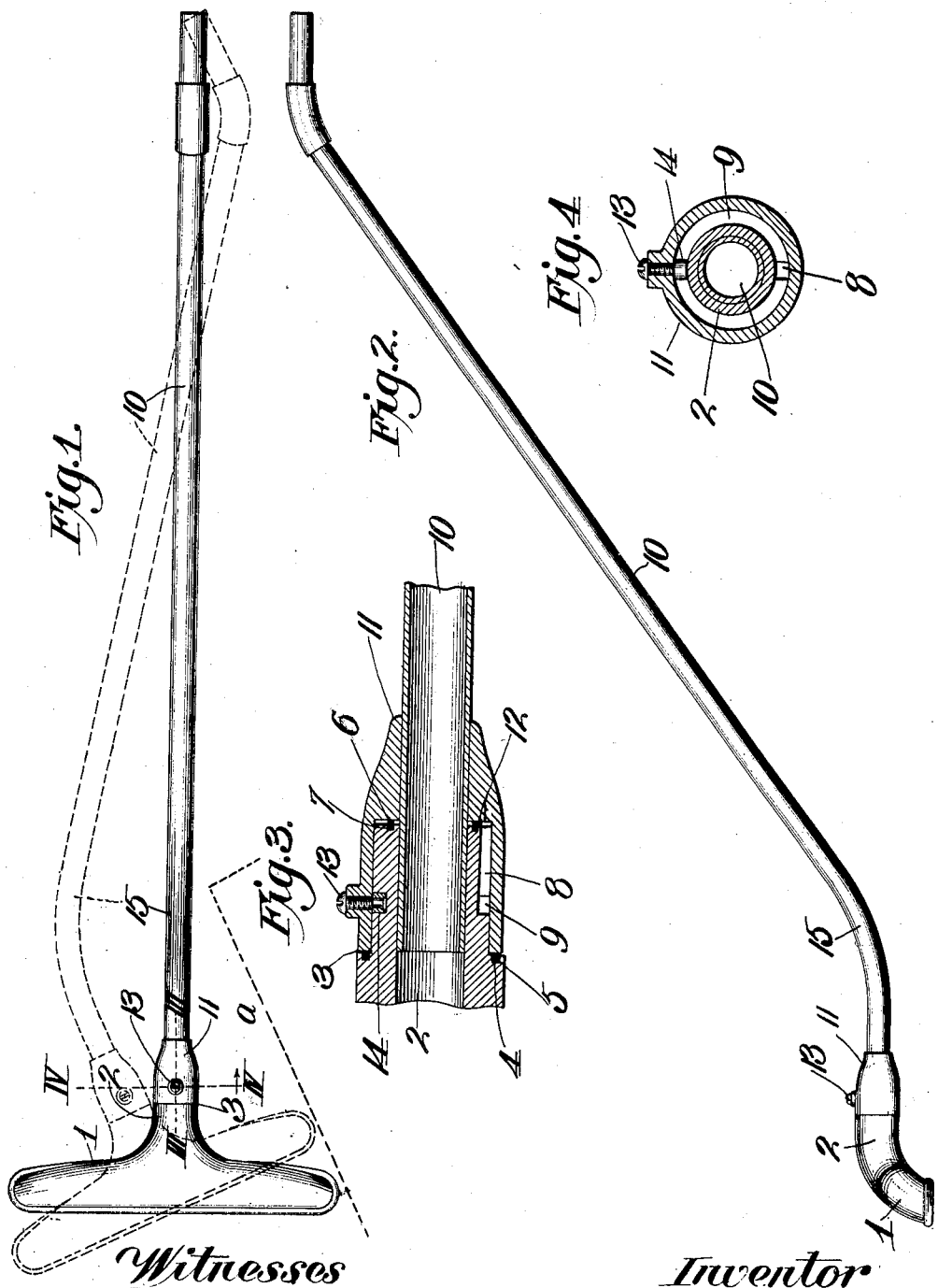
Witnesses
Frank R Glow
H. C. Rodgers
Inventor
John T. Hope
By George T. Hope Atty.

UNITED STATES PATENT OFFICE.

JOHN T. HOPE, OF KANSAS CITY, MISSOURI.

VACUUM-CLEANER TOOL.

1,086,367.   Specification of Letters Patent.   Patented Feb. 10, 1914.

Application filed February 6, 1912. Serial No. 675,723.

*To all whom it may concern:*

Be it known that I, JOHN T. HOPE, a citizen of the United States, residing at Kansas City, in the county of Jackson and State of Missouri, have invented certain new and useful Improvements in Vacuum-Cleaner Tools, of which the following is a specification.

This invention relates to vacuum cleaner tools and has for its object to produce a swivel air-tight connection between the shank of the tool and the handle whereby the operator is enabled to obtain access below objects supported three or four inches above the floor.

With this general object in view and others as hereinafter appear, the invention consists in certain novel and peculiar features of construction and organization as hereinafter described and claimed; and in order that it may be fully understood reference is to be had to the accompanying drawing, in which—

Figure 1, is a top plan view of a vacuum cleaner tool embodying my invention. Fig. 2, is a side elevation of the same. Fig. 3, is a central vertical section on the line III—III of Fig. 1. Fig. 4, is a section on the line IV—IV of Fig. 1.

In the said drawing, 1 is the tool mouth piece of well-known type, for movement over a floor or carpet to pick up dust, lint or other dirt therefrom, and 2 is the tubular shank of the mouth piece. The shank is diametrically reduced at its rear end to provide a rearwardly-disposed shoulder 3, and said shoulder is provided with a circular channel 4, in which is secured a gasket 5. A similar gasket 6 is secured in a circular channel 7 in the front end of the shank, and said shank is provided outward of the last-named gasket and preferably vertically below the axis of the shank with a longitudinal channel 8, and between the gaskets with a circumferential channel 9 communicating with the front or inner end of channel 8.

10 is a tubular handle and secured upon the front end of the same is a collar 11, which for about half its length, is diametrically enlarged internally to form a forwardly-disposed shoulder 12, to bear against gasket 6, and to fit over the reduced portion of the shank and bear against gasket 3, and extending radially into the enlarged portion of the collar vertically above its axis, is a screw or pin 13, equipped at its inner end with a roller 14, engaging the circumferential channel 9 of the shank when the handle is attached to the mouth-piece.

To secure the handle to the mouth-piece, it is first turned to dispose roller 14 in line with the channel 8. The reduced portion of the shank and the collar are then fitted telescopically together and the front end of the handle extends into the shank to make the connection more stable and effective. The handle is then turned to cause the roller to enter the circumferential channel 9, the endwise engagement between the shank and collar being made air-tight through the interposition of the gaskets 5 and 6, so that it will be impossible for any air to escape from the mouth-piece through the joint between the same and the handle, the latter being connected as customary, by a flexible tube or hose to a suction apparatus, not shown.

The tool is manipulated in the usual manner and because of the bent form of the handle, the mouth-piece can be slipped under an object, such as a desk or side-board standing only a few inches from the floor. To accomplish this purpose the handle is turned without lifting the mouth-piece from the floor, until the rear end of the former is about the same height as its front end, being turned a quarter revolution to accomplish this purpose.

Where it is desired to manipulate the tool along the side or end of an object, represented by dotted lines *a*, assuming the space is so restricted that it cannot be accomplished with the tool in the position shown in full lines Fig. 1, the handle can be turned slightly so as to dispose it at an angle to such line as shown by dotted lines said figure, as by this adjustment of the handle, its curved lower portion 15 is bowed around the corner of the object and the tool stands at right angles to the end of the latter.

It will be apparent that it is impossible for the mouth-piece to become accidentally detached from the handle while in use, as it can not turn the half revolution in one direction, necessary to bring roller 14 in line with channel 8, as the limit of its rotatable adjustment necessary in the manipulation of the mouth-piece is a quarter revolution toward one side or the other, and in practice the roller 14 will be disposed at a point in channel 9 diametrically opposite channel 8 when the handle and mouth-piece occupy their normal relation, as shown by full lines in the drawing.

From the above description it will be apparent that I have produced a vacuum cleaning tool embodying the features of advantage enumerated as desirable, and I wish it to be understood that while I have illustrated and described the preferred embodiment of the invention, I do not desire to be restricted to the exact details of construction shown and described as obvious modifications will suggest themselves to one skilled in the art.

I claim:—

A coupling, comprising a tubular member having a reduced portion, said reduced portion being provided with an annular groove and with a longitudinal groove communicating with said annular groove and extending to the end of the reduced portion, a collar member fitting rotatably on said reduced portion, annular gaskets interposed between the abutting portions of said members, a pin secured in said collar member, and a roller mounted on the inner end of the pin and adapted to be passed through the longitudinal groove into the annular groove, thereby forming a swivel air-tight connection between said members.

In testimony whereof I affix my signature, in the presence of two witnesses.

JOHN T. HOPE.

Witnesses:
HELEN C. RODGERS,
G. Y. THORPE.